United States Patent
Noh et al.

(10) Patent No.: US 11,977,931 B2
(45) Date of Patent: May 7, 2024

(54) ELECTRONIC DEVICE AND METHOD FOR CONTROLLING DATA THROUGHPUT BASED ON HEAT GENERATION IN ELECTRONIC DEVICE

(71) Applicant: Samsung Electronics Co., Ltd., Suwon-si (KR)

(72) Inventors: Hyunjin Noh, Suwon-si (KR); Sungyong Bang, Suwon-si (KR); Jonglin Lee, Suwon-si (KR); Jongwoo Kim, Suwon-si (KR); Hakryoul Kim, Suwon-si (KR); Mooyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 846 days.

(21) Appl. No.: 16/931,969

(22) Filed: Jul. 17, 2020

(65) Prior Publication Data

US 2021/0026709 A1 Jan. 28, 2021

(30) Foreign Application Priority Data

Jul. 22, 2019 (KR) ........................ 10-2019-0088243

(51) Int. Cl.
*G06F 9/50* (2006.01)
*G01K 7/22* (2006.01)
*G01K 13/00* (2021.01)

(52) U.S. Cl.
CPC ............. *G06F 9/5094* (2013.01); *G01K 7/22* (2013.01); *G01K 13/00* (2013.01)

(58) Field of Classification Search
CPC ......... G06F 9/5094; G01K 7/22; G01K 13/00
See application file for complete search history.

(56) References Cited

U.S. PATENT DOCUMENTS

2002/0065049 A1 5/2002 Chauvel et al.
2013/0120630 A1 5/2013 Kim et al.
(Continued)

FOREIGN PATENT DOCUMENTS

EP    1 182 538 A2    2/2002
JP    2002/202893 A    7/2002
(Continued)

OTHER PUBLICATIONS

Atsuo, JP 2011229077, Global Dossier translation (Year: 2011).*
(Continued)

*Primary Examiner* — Wissam Rashid
(74) *Attorney, Agent, or Firm* — Jefferson IP Law, LLP

(57) ABSTRACT

An electronic device is provided. An electronic device includes at least one antenna module, a first communication circuit configured to provide first communication via the at least one antenna module, a plurality of temperature sensor, at least one processor operationally connected to the first communication circuit and the plurality of temperature sensors, and a memory. The memory may store instructions which, when executed, cause the at least one processor to obtain a first temperature associated with the electronic device via the plurality of temperature sensors, identify a second temperature associated with the first communication based on the first temperature being equal to or higher than a first threshold value, identify an operation state of at least one application, in which data throughput associated with the first communication is equal to or more than designated throughput, based on the second temperature being equal to or higher than a second threshold value, and adjust first data throughput of a first application, which is operating in a background state, among the at least one application.

21 Claims, 11 Drawing Sheets

(56) References Cited

U.S. PATENT DOCUMENTS

| | | |
|---|---|---|
| 2015/0067377 A1 | 3/2015 | Park et al. |
| 2015/0261284 A1 | 9/2015 | Lee et al. |
| 2016/0062423 A1 | 3/2016 | Kim et al. |
| 2017/0160785 A1 | 6/2017 | Mittal et al. |
| 2018/0181171 A1* | 6/2018 | Jang ................ G01K 7/427 |
| 2019/0108066 A1 | 4/2019 | Kim et al. |
| 2020/0036643 A1 | 1/2020 | Jang et al. |

FOREIGN PATENT DOCUMENTS

| | | |
|---|---|---|
| JP | 2011-229077 A | 11/2011 |
| KR | 10-2013-0051569 A | 5/2013 |
| KR | 10-2016-0145999 A | 12/2016 |
| KR | 10-2017-0068252 A | 6/2017 |
| KR | 10-2017-0108636 A | 9/2017 |
| KR | 10-2018-0113861 A | 10/2018 |
| KR | 10-2019-0127306 A | 11/2019 |
| WO | 2018/186699 A1 | 10/2018 |

OTHER PUBLICATIONS

International Search Report and written opinion dated Oct. 21, 2020, issued in International Application No. PCT/KR2020/009679.
Extended European Search Report dated May 12, 2022, issued in European Patent Application No. 20844450.5.
European Examination Report dated Nov. 15, 2023, issued in European Patent Application No. 20 844 450.5.
Korean Office Action dated Mar. 21, 2024, issued in Korean Application No. 10-2019-0088243.

\* cited by examiner

| DIVISION | FIRST APPLICATION | | SECOND APPLICATION | | SURFACE TEMPERATURE DUE TO HEAT GENERATION |
|---|---|---|---|---|---|
| | CPU % | Mbps | FPS | Stability | |
| BEFORE DATA THROUGHPUT CONTROL | 4.22% | 105.39 | 56FPS | 88% | 42.6℃ |
| AFTER DATA THROUGHPUT CONTROL | 3.25% | 76.29 | 58FPS | 98% | 40.4℃ |

FIG.10

ELECTRONIC DEVICE AND METHOD FOR CONTROLLING DATA THROUGHPUT BASED ON HEAT GENERATION IN ELECTRONIC DEVICE

CROSS-REFERENCE TO RELATED APPLICATION(S)

This application is based on and claims priority under 35 U.S.C. § 119 of a Korean patent application number 10-2019-0088243, filed on Jul. 22, 2019, in the Korean Intellectual Property Office, the disclosure of which is incorporated by reference herein in its entirety.

BACKGROUND

1. Field

The disclosure relates to an electronic device. More particularly, the disclosure related to an electronic device and a method for improving heat generation in an electronic device.

2. Description of Related Art

In order to satisfy wireless data traffic demands which have been increased since the commercialization of the 4th generation (4G) communication system, efforts have been made to develop a 5th generation (5G) communication system. In order to achieve a high data transmission rate, consideration has been given to an attempt to enable the 5G communication system to use a new band, for example, an ultrahigh frequency band (e.g., a 60 GHz band) in addition to used communication bands of the related art such as 3rd generation (3G) and long-term-evolution (LTE).

Multiple antenna modules may be installed in an electronic device for supporting mmWave which is an ultrahigh frequency band. A wireless channel in an mmWave band has high straightness and high path loss due to high frequency characteristics thereof. A highly directional beamforming technology is indispensable for solving the problems of high straightness and high path loss, and highly directional beamforming requires multiple antenna modules. For example, an electronic device may include multiple antenna modules for radiating signals in different directions, respectively.

The above information is presented as background information only to assist with an understanding of the disclosure. No determination has been made, and no assertion is made, as to whether any of the above might be applicable as prior art with regard to the disclosure.

SUMMARY

A 5th generation (5G) communication technology may transmit a large amount of data and consume a large amount of power, and thus may potentially increase the temperature of an electronic device. For example, an electronic device inevitably consumes a large amount of power due to the use of a high frequency band and the increase of data throughput. Thus, with the increased heat-generation amount, an antenna module in use and the periphery of the antenna may be overheated. When a particular antenna module and the periphery thereof are overheated, a user of the electronic device may feel discomfort and furthermore may suffer a low-temperature burn. With additional damage to components (e.g., a battery) arranged around the overheated antenna module, the overall performance of the electronic device may become degraded. Further, various applications including a data transmission/reception function via 5G communication may be installed and used in an electronic device. When the electronic device executes an application in which the amount of data transmitted/received via 5G communication is excessive, the larger amount of heat may be generated with the use of a high frequency band and the increase of data throughput.

Aspects of the disclosure are to address at least the above-mentioned problems and/or disadvantages and to provide at least the advantages described below. Accordingly, an aspect of the disclosure is to provide an electronic device capable of efficiently controlling heat generation during 5G communication, and a method for controlling data throughput based on heat generation in the electronic device.

Additional aspects will be set forth in part in the description which follows and, in part, will be apparent from the description, or may be learned by practice of the presented embodiments.

In accordance with an aspect of the disclosure, an electronic device is provided. An electronic device includes and is capable of controlling data throughput of an application, which uses a large amount of data in connection with 5G communication, to reduce heat generation, and a method for controlling data throughput based on heat generation in the electronic device.

In accordance with another aspect of the disclosure, an electronic device is provided. The electronic device includes enabling a stable application execution while reducing a heat generation amount by controlling data throughput of an application operating in a background among applications which use a large amount of data in connection with 5G communication, and a method for controlling data throughput based on heat generation in the electronic device.

In accordance with another aspect of the disclosure, an electronic device is provided. The electronic device includes at least one antenna module, a first communication circuit configured to provide first communication via the at least one antenna module, a plurality of temperature sensors, at least one processor operationally connected to the first communication circuit and the plurality of temperature sensor, and a memory, wherein the memory may be configured to store instructions which, when executed, cause the at least one processor to obtain a first temperature associated with the electronic device via the plurality of temperature sensors, identify a second temperature associated with the first communication based on the first temperature being equal to or higher than a first threshold value, identify an operation state of at least one application, in which data throughput associated with the first communication is equal to or more than designated throughput, based on the second temperature being equal to or higher than a second threshold value, and adjust first data throughput of a first application, which is operating in a background state, among the at least one application.

In accordance with another aspect of the disclosure, a method for controlling data throughput based on heat generation in an electronic device is provided. The method includes obtaining a first temperature associated with the electronic device via multiple temperature sensors, identifying a second temperature associated with a first communication based on the first temperature being equal to or higher than a first threshold value, identifying an operation state of at least one application, in which data throughput associated with the first communication is equal to or more than designated throughput, based on the second temperature being equal to or higher than a second threshold value, and adjusting first data throughput of a first application, which is operating in a background state, among the at least one application.

According to various embodiments, in a non-transitory computer-recording medium having recorded thereon at least one program comprising commands, which when executed by a computer, performs a method, the method comprising obtaining a first temperature associated with an electronic device via a plurality of temperature sensors, identifying a second temperature associated with a first communication based on the first temperature being equal to or higher than a first threshold value, identifying an operation state of at least one application, in which data throughput associated with the first communication is equal to or more than designated throughput, based on the second temperature being equal to or higher than a second threshold value, and adjusting first data throughput of a first application, which is operating in a background state, among the at least one application.

According to various embodiments, it is possible to efficiently control heat generation of an electronic device during 5G communication.

According to various embodiments, it is possible to efficiently reduce heat generation of an electronic device by controlling data throughput of an application which uses a large amount of data in connection with 5G communication.

According to various embodiments, it is possible to carry out a stable application execution while reducing a heat generation amount by controlling data throughput of an application operating in a background among applications which use a large amount of data in connection with 5G communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates an example of a table showing the result of performance and heat generation improvement before and after application data throughput control according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein are merely for the purpose of describing particular embodiments and are not intended to limit the scope of other embodiments. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the terms defined in the disclosure should not be interpreted to exclude embodiments of the disclosure.

Figure 1:
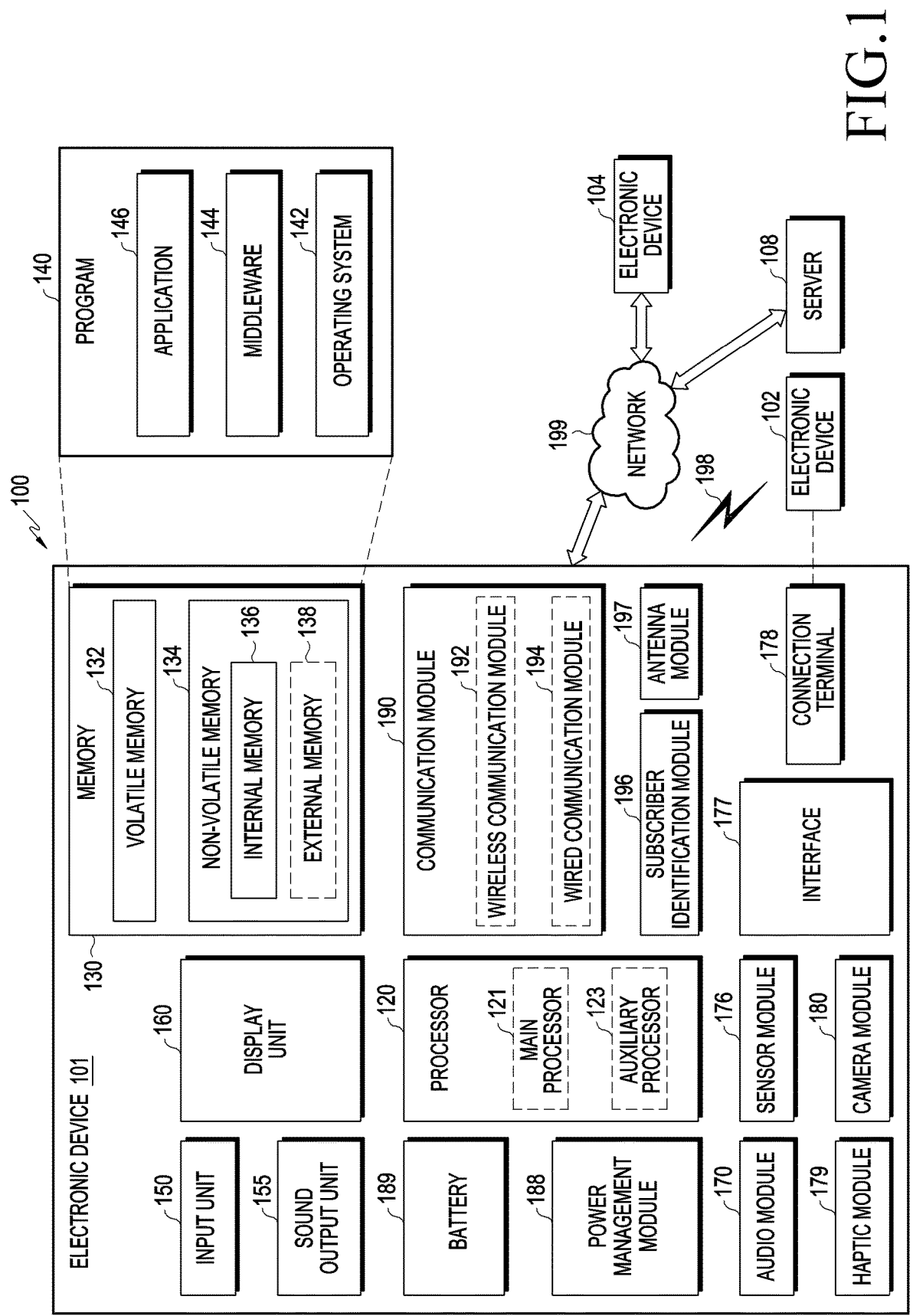
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
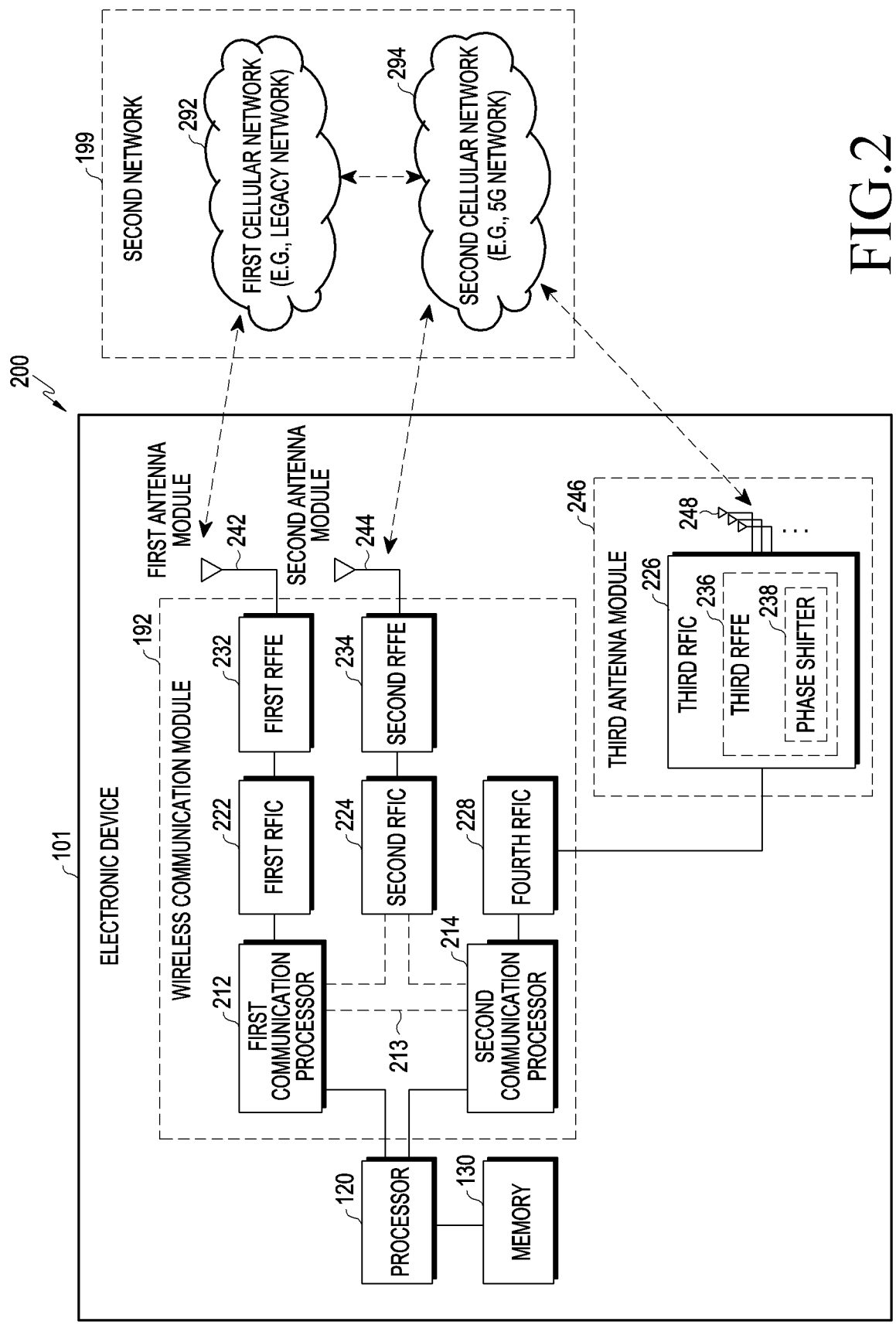
FIG. 2 illustrates an electronic device in a network environment including multiple cellular networks according to an embodiment of the disclosure.

FIG. 2 is a block diagram 200 of an electronic device 101 in a network environment including multiple cellular networks according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to another embodiment, the electronic device 101 may further include at least one of the components illustrated in FIG. 1, and the second network 199 may further include at least another network. According to one embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may establish a communication channel in a band usable for wireless communication with the first cellular network 292, and may support legacy network communication via the established communication channel. According to various embodiments, the first cellular network may be a legacy network including a 2G, 3G, 4G, or long-term-evolution (LTE) network. The second communication processor 214 may establish a communication channel corresponding to a designated band (e.g., from about 6 GHz to about 60 GHz) among bands usable for wireless communication with the second cellular network 294, and may support 5G network communication via the established communication channel. According to various embodiments, the second cellular network 294 may be a 5G network defined in 3GPP. In addition, according to one embodiment, the first communication processor 212 or the second communication processor 214 may establish a communication channel corresponding to another designated band (e.g., about 6 GHz or less) among bands usable for wireless communication with the second cellular network 294, and may support 5G network communication via the established communication channel. According to one embodiment, the first communication processor 212 and second communication processor 214 may be implemented in a single chip or a single package. According to various embodiments, the first communication processor 212 or the second communication processor 214 may be disposed in the processor 120, the auxiliary processor 123, or the communication module 190 and in a single chip or a single package. According to various embodiments, the first communication processor 212 may communicate with the second communication processor 214 using a interprocessor communication 213.

At the time of signal transmission, the first RFIC 222 may convert a baseband signal generated by the first communication processor 212 into a radio frequency (RF) signal of about 700 MHz to about 3 GHz used for the first cellular network 292 (e.g., the legacy network). At the time of RF signal reception, an RF signal may be obtained from the first cellular network 292 (e.g., the legacy network) via an antenna (e.g., the first antenna module 242), and may be preprocessed through an RFFE (e.g., the first RFFE 232). The first RFIC 222 may convert the preprocessed RF signal into a baseband signal such that the baseband signal can be processed by the first communication processor 212.

At the time of signal transmission, the second RFIC 224 may convert a baseband signal generated by the first communication processor 212 or the second communication processor 214 into an RF signal of a Sub6 band (e.g., about 6 GHz or less) (hereinafter, referred to as "5G Sub6 RF signal") used for the second cellular network 294 (e.g., a 5G network). At a time of signal reception, the 5G Sub6 RF signal may be obtained from the second cellular network 294 (e.g., the 5G network) via an antenna (e.g., the second antenna module 244), and may be preprocessed through an RFFE (e.g., the second RFFE 234). The second RFIC 224 may convert the preprocessed 5G Sub6 RF signal into a baseband signal such that the baseband signal can be processed by a pertinent communication processor among the first communication processor 212 or the second communication processor 214.

The third RFIC 226 may convert a baseband signal generated by the second communication processor 214 into an RF signal of a 5G Above6 band (from about 6 GHz to about 60 GHz) (hereinafter, referred to as "5G Above6 signal") used for the second cellular network 294 (e.g., the 5G network). At the time of signal reception, the 5G Above6 signal may be obtained from the second cellular network 294 (e.g., the 5G network) via an antenna (e.g., the antenna 248), and may be preprocessed through a third RFFE 236. The third RFIC 226 may convert the preprocessed 5G Above6 signal into a baseband signal such that the baseband signal can be processed by the second communication processor 214. According to one embodiment, the third RFFE 236 may be formed as a part of the third RFIC 226.

According to one embodiment, the electronic device 101 may include the fourth RFIC 228 separately from the third RFIC 226 or as at least a part thereof. The fourth RFIC 228 may convert a baseband signal generated by the second communication processor 214 into an RF signal of an intermediate frequency band (e.g., from about 9 GHz to about 11 GHz) (hereinafter, referred to as "IF signal"), and may then transmit the IF signal to the third RFIC 226. The third RFIC 226 may convert the IF signal into a 5G Above6 RF signal. At the time of signal reception, the 5G Above6 RF signal may be received from the second cellular network 294 (e.g., a 5G network) via an antenna (e.g., the antenna 248), and may be converted into an IF signal by the third RFIC 226. The fourth RFIC 228 may convert the IF signal into a baseband signal that can be processed by the second communication processor 214.

According to one embodiment, the first RFIC 222 and the second RFIC 224 may be implemented as at least a part of a single package or a single chip. According to one embodiment, the first RFFE 232 and the second RFFE 234 may be implemented as at least a part of a single package or a single chip. According to one embodiment, at least one antenna module among the first antenna module 242 or the second antenna module 244 may be omitted, or may be combined with the other antenna module to process RF signals of multiple bands corresponding thereto.

According to one embodiment, the third RFIC 226 and the antenna 248 may be arranged on the same substrate to constitute a third antenna module 246. For example, the wireless communication module 192 or the processor 120 may be arranged on a first substrate (e.g., a main PCB). In this instance, the third antenna module 246 may be configured by arranging the third RFIC 226 in a partial area (e.g., a lower surface) of a second substrate (e.g., a sub PCB) independent of the first substrate and arranging the antenna 248 in another partial area (e.g., an upper surface) of the second substrate. Arranging the third RFIC 226 and the antenna 248 on the same substrate can reduce the length of a transmission line there between. This arrangement may reduce, for example, the loss (e.g., attenuation) of a signal in a high-frequency band (e.g., from about 6 GH to about 60 GHz), used for 5G network communication, due to the transmission line. Therefore, the electronic device 101 may enhance the quality or speed of communication with the second cellular network 294 (e.g., a 5G network).

According to one embodiment, the antenna 248 may be formed as an antenna array including multiple antenna elements which can be used for beamforming. In this instance, for example, the third RFIC 226 may include, as a part of the third RFFE 236, multiple phase shifters 238 corresponding to the multiple antenna elements. At the time of signal transmission, each of the multiple phase shifters 238 may shift the phase of a 5G Above6 RF signal to be transmitted from the electronic device 101 to the outside (e.g., a base station of a 5G network) via an antenna element corresponding thereto. At the time of signal reception, each of the multiple phase shifters 238 may shift the phase of a 5G Above6 RF signal received from the outside via an antenna element corresponding thereto into an identical or substantially identical phase. This enables transmission or reception through beamforming between the electronic device 101 and the outside.

The second cellular network 294 (e.g., a 5G network) may be operated independently of the first cellular network 292 (e.g., a legacy network) (e.g., standalone (SA)) or may be operated while being connected to the first cellular network (e.g., non-standalone (NSA)). For example, the 5G network may include only an access network (e.g., a 5G radio access network (RAN) or next-generation RAN (NG RAN)) and may not include a core network (e.g., a next-generation core (NGC) network). In this instance, the electronic device 101 may access the access network of the 5G network and may then access an external network (e.g., Internet) under the control of a core network (e.g., an evolved packed core (EPC) network) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
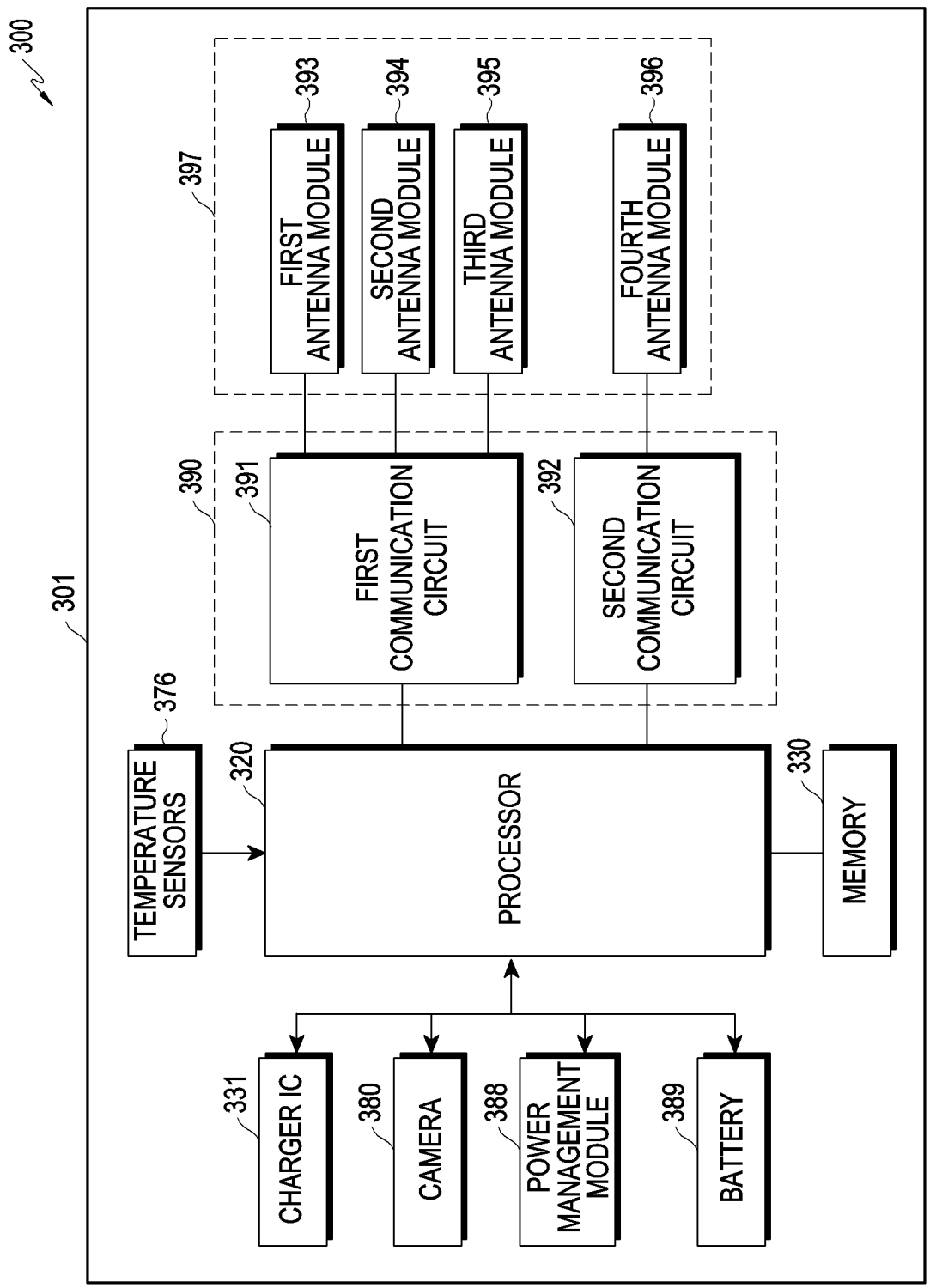
FIG. 3 is an internal block configuration diagram of an electronic device according to an embodiment of the disclosure.

FIG. 3 is an internal block configuration diagram 300 of an electronic device according to an embodiment of the disclosure.

For example, an electronic device 301 may include all or a part of the electronic device 101 illustrated in FIG. 1 or 2. The electronic device 301 may include at least one processor 320 (e.g., an application processor (AP)), a memory 330, a charger IC 331, temperature sensors 376, a camera 380, a power management module 388, a battery 389, a communication circuit 390, and an antenna module 397. According to one embodiment, in the electronic device 301, at least one of the elements may be omitted or another element may be additionally included.

Referring to FIG. 3, the term such as "module" in the electronic device 301 refers to a unit for processing at least one function or operation. This may be implemented by hardware, software, or a combination of the hardware and the software. The term "module" is described in connection with the electronic device 301 but may be replaced with the term "circuitry", "unit", or "device".

According to various embodiments, the communication circuit 390 may include a first communication circuit 391 and a second communication circuit 392. According to one embodiment, the first communication circuit 391 may perform communication in a first communication scheme via the antenna module 397, and the second communication circuit 392 may perform communication in a second communication scheme. According to one embodiment, the first communication scheme may be a communication scheme based on a 5G communication protocol, and the second communication scheme may be a communication scheme based on a 4G or LTE communication protocol.

According to one embodiment, the communication circuit 390 may include a communication processor (CP), a transceiver, and/or a power amplifier module (PAM), and the CP, the transceiver, and the power amplifier module may be implemented in the form of an integrated module (or chip). For example, the CP may control the communication circuit 390 to receive data transmitted from a network and transmit data received from the processor 120 (e.g., an AP) to the network. According to one embodiment, the CP may support 4G or LTE communication and/or 5G communication of the electronic device 301. For example, the CP may include: a first CP (e.g., a 4G or LTE modem) for supporting legacy network communication, and a second CP (e.g., a 5G modem) for supporting 5G network communication.

According to various embodiments, the transceiver may convert a transmission baseband signal into an RF signal, or may convert an RF signal into a baseband signal. According to one embodiment, the transceiver may convert a baseband signal into RF signals of various bands. According to one embodiment, the transceiver may include: a first transceiver for supporting 4G or LTE network communication; and a second transceiver for supporting 5G network communication. For example, the first transceiver may convert a signal to be transmitted from a baseband signal to a 5G-based RF signal of a 6 GHz band or less, or may convert a received 5G-based RF signal of a 6 GHz band or less into a baseband signal. According to one embodiment, the first transceiver may convert a baseband signal into a 5G-based RF signal of a 6 GHz band or more or into an RF signal based on an ultrahigh frequency band (e.g., an mmWave band) by employing a heterodyne transceiver using an intermediate frequency (IF). For example, the second transceiver may convert a signal to be transmitted from a baseband signal to a 4G or LTE-based RF signal, or may convert a received 4G or LTE-based RF signal based into a baseband signal.

According to various embodiments, the power amplifier module may amplify an RF signal transmitted from the transceiver and may transmit the amplified RF signal to the antenna module 397. For example, the power amplifier module may include a first power amplifier module (e.g., a 4G or LTE PAM) and a second power amplifier module (e.g., a 5G PAM). The first power amplifier module may amplify an RF signal transmitted from the first transceiver and may transmit the amplified RF signal to the antenna module 397. The second power amplifier module may amplify an RF signal transmitted from the second transceiver and may transmit the amplified RF signal to the antenna module 397.

According to various embodiments, the antenna module 397 may include multiple antenna modules 393, 394, 395, and 396. Some antenna modules 393, 394, and 395 of the multiple antenna modules 393, 394, 395, and 396 may be connected to the first communication circuit 391, and the remaining antenna module 396 may be connected to the second communication circuit 392. According to one embodiment, a description has been made of the case where the number of the multiple antenna modules 393, 394, 395, and 396 is four. However, the number of the multiple antenna modules may be smaller than four or may exceed four. For example, the antenna modules 393, 394, and 395 connected to the first communication circuit 391 may be formed as an antenna array which includes multiple antenna elements usable for beamforming. For example, the fourth antenna module 396 connected to the second communication circuit 392 may be provided for 4G or LTE communication.

According to various embodiments, the temperature sensors 376 may be a plurality of thermistors arranged inside the electronic device 301. Each of the temperature sensors 376 may output a temperature value according to a resistance value changing depending on temperature, or the processor 320 may identify (e.g., check) the temperature value according to the resistance value. According to various embodiments, each of the temperature sensors 376 may be disposed in a position corresponding to or adjacent to each of elements included in the electronic device 301. For example, each of the temperature sensors 376 may be arranged in a region adjacent to the respective elements, such as the processor 320, the charger IC 331, the camera 380, the power management module 388, the battery 389, the first communication circuit 391, the second communication circuit 392, the first antenna module 393, the second antenna module 394, the third antenna module 395, and the fourth antenna module 396. According to various embodiments, the electronic device 301 may further include various other elements such as a sub PCB (not shown) or a Wi-Fi module (not shown) in addition to the above-described elements, and each of the temperature sensors 376 may be further arranged adjacent to each of the various other elements.

According to various embodiments, each of the temperature sensors 376 may operate under control of the processor (AP or CP) 320. Each of the temperature sensors 376 may passively transmit a state corresponding to a temperature value in response to a command of the AP or the CP, and thus the AP or the CP may obtain a temperature associated with each of the elements from the temperature sensors 376. According to one embodiment, each of the temperature sensors 376 may be arranged in a position corresponding to each of heat-generating sources (e.g., each of elements designated as heat-generating sources) among the elements included in the electronic device 301.

According to various embodiments, the processor 320 may obtain a surface temperature due to heat generation (e.g., referred to as "first temperature") of the electronic device 301 by using the temperature sensors 376 (or at least one of the temperature sensors 376). For example, the processor 320 may obtain a first temperature of the electronic device 301 by periodically checking a temperature value (or temperature values) measured by the temperature sensors 376 (or at least one temperature sensor associated with surface heat generation among the temperature sensors 376) according to a designated period. Alternatively, the processor 320 may obtain the first temperature by using a temperature value measured by the temperature sensors 376 (or at least one temperature sensor associated with surface heat generation among the temperature sensors 376) and an algorithm (e.g., linear regression analysis algorithm) stored to predict a surface temperature due to heat generation. For example, the processor 320 may obtain the first temperature by using a temperature value from at least one temperature sensor disposed adjacent to the surface of the electronic device 301, or may obtain the first temperature predicted through learning which gives consideration to a temperature value from at least one temperature sensor and the operation type of the electronic device 301.

According to various embodiments, the processor 320 may check whether the first temperature is equal to or higher than a designated temperature (e.g., a first threshold value or a first threshold temperature value). According to one embodiment, the designated temperature is a surface temperature due to heat generation of the electronic device 301, at which the electronic device 301 (or at least one element of the electronic device 301) may malfunction or a user may feel discomfort due to heat generation during the use of the electronic device 301. The designated temperature may be a first threshold value or a first threshold temperature value and may be stored in the electronic device 301. For example, the first threshold value or the first threshold temperature value may be 38° C. In addition, the first threshold value or the first threshold temperature value may be configured as another value according to the performance of the electronic device 301 and the external environment. When the first temperature is equal to or higher than the designated temperature, the processor 320 may determine the state of the electronic device 301 to be an overheated state.

According to various embodiments, when the first temperature is equal to or higher than the first threshold value, the processor 320 may check a second temperature associated with first communication (e.g., 5G communication). According to various embodiments, the second temperature associated with the first communication may be a temperature according to heat generation of at least one of elements operating while the first communication is performed (hereinafter "first-communication-related elements")(e.g., a 5G modem, a 5G PAM, a 5G antenna) among elements included in the electronic device 301. According to one embodiment, the processor 320 may obtain the second temperature on the basis of a temperature value obtained by at least one of the temperature sensors 376, which is adjacent to the elements operating while the first communication is performed.

According to various embodiments, the processor 320 may check, based on the second temperature, the operation state of at least one application in which data throughput (e.g., the data usage amount) associated with the first communication is equal to or more than designated throughput (e.g., the designated usage amount). According to one embodiment, when the second temperature generated by at least one of the first-communication-related elements among the elements included in the electronic device 301 is equal to or higher than a second threshold value, the processor 320 may determine that the electronic device 301 is in an overheated state due to the first communication. According to one embodiment, the second threshold value may be equal to or greater than the first threshold value. According to one embodiment, in the state in which the first temperature is equal to or higher than the first threshold value, when the second temperature generated by at least one of the first-communication-related elements is higher than the temperature generated by other elements included in the electronic device 301, the processor 320 may determine that the electronic device 301 is in an overheated state due to the first communication. According to one embodiment, in the state in which the first temperature is equal to or higher than the first threshold value, when the temperature sensor, the temperature of which is highest among the temperatures of the temperature sensors 376, is a temperature sensor associated with a first-communication-related element, the processor 320 may determine that the electronic device 301 is in an overheated state due to the first communication.

According to various embodiments, when the electronic device is determined to be in an overheated state due to the first communication, the processor 320 may check the operation state of at least one application in which data throughput associated with the first communication is equal to or more than designated throughput.

According to various embodiments, when the electronic device is determined to be in an overheated state due to the first communication, the processor 320 may identify at least one application in which data throughput (e.g., data throughput for a predetermined time) associated with the first communication is equal to or more than designated data throughput (e.g., 50 Mpbs), and may identify whether the operation state of the identified at least one application is a background operation state or a foreground operation state. For example, the processor 320 may identify, using network usage history information (e.g., Netstat information), at least one application in which a 5G data usage amount is equal to or more than a designated usage amount, and may identify whether the operation state of the identified at least one application is a background operation state or a foreground operation state. According to one embodiment, the background operation state may be an invisible state in which a display function of an application is not performed, and the foreground operation state may be a visible state in which the display function of the application is performed. For example, the processor 320 may identify, using a call stack of a window manager, whether the operation state of at least one application is an invisible state or a visible state.

According to various embodiments, when the electronic device 301 is in an overheated state due to the first communication, the processor 320 may control data throughput (or rate) of a first application which is in a background state and in which data throughput associated with the first communication is equal to or more than a designated throughput. According to one embodiment, when the electronic device 301 is in an overheated state due to the first communication, the processor 320 may reduce the data throughput (or rate) of the first application which is operating in a background state and in which data throughput (e.g., data throughput for a predetermined time) associated with the first communication is equal to or more than a designated throughput (e.g., 50 Mpbs), but may not reduce or may increase the data throughput (or rate) of a second application which is operating in a foreground state and in which the data throughput associated with the first communication is equal to or more than the designated data throughput (e.g., 50 Mpbs).

According to various embodiments, the processor 320 may apply a preconfigured control policy (or control scheme) (e.g., a slowdown scheme) to controlling the data throughput (or rate) of the first application. According to various embodiments, the slowdown scheme may include at least one of a CPU set control scheme or a CPU running time control scheme (e.g., also referred to as "CPU bandwidth control scheme").

According to various embodiments, when the CPU set control scheme is used, the processor 320 may reduce the data throughput (or rate) of the first application by causing a core having low data throughput (or data usage amount) (e.g., a core having data throughput equal to or less than a threshold value) among different cores of a CPU to process data of the first application. According to one embodiment, when the CPU running time control scheme is used, the processor 320 may reduce the data throughput (or rate) of the first application by reducing a running time related to processing data of the first application in a bandwidth of a CPU for processing data of the first application. For example, as the data throughput (or rate) of the first application is reduced, data throughput associated with the first communication may be reduced, a load applied to elements associated with the first communication may be reduced, and thus the amount of heat generated by each of the elements associated with the first communication may be reduced. When the amount of heat generated by each of the elements associated with the first communication is reduced, the surface temperature due to heat generation of the electronic device 301 may be also reduced and thus the electronic device 301 may return from the overheated state to a normal state.

According to various embodiments, the electronic device 301 may include: at least one antenna module 397; a first communication circuit 391 configured to provide first communication via the at least one antenna module; a plurality of temperature sensors 376; at least one processor 320 operationally connected to the first communication circuit and the plurality of temperature sensors; and a memory 330, wherein the memory may be configured to store instructions which, when executed, cause the at least one processor to: obtain a first temperature associated with the electronic device via the plurality of temperature sensors; identify(or check) a second temperature associated with the first communication when the first temperature is equal to or higher than a first threshold value; identify(or check), based on the second temperature, an operation state of at least one application in which data throughput associated with the first communication is equal to or more than designated throughput; and adjust first data throughput of a first application, which is operating in a background state, among the at least one application.

According to various embodiments, wherein the first temperature is a temperature on a surface of a housing based on heat generation in the electronic device.

According to various embodiments, the instructions are configured to cause the at least one processor not to adjust second data throughput of a second application, which is operating in a foreground state, among the at least one application.

According to various embodiments, the background state comprises a state in which the electronic device displays a screen on a display of the electronic device, and the foreground state comprises a state in which the electronic device does not display a screen on the display of the electronic device.

According to various embodiments, the instructions are configured to cause the at least one processor to adjust the first data throughput of the first application by using slowdown schemes.

According to various embodiments, the instructions are configured to cause the at least one processor to adjust the first data throughput of the first application by using a CPU running time control scheme among the slowdown schemes.

According to various embodiments, the instructions are configured to cause, when the CPU running time control scheme is used, the at least one processor to change a time for processing data of the first application within a CPU bandwidth from a first time interval to a second time interval smaller than the first time interval.

According to various embodiments, the instructions are configured to cause, when the CPU running time control scheme is used, the at least one processor to change a quota value within the bandwidth for processing the data of the first application from a first time value to a second time value smaller than the first time value.

According to various embodiments, the instructions are configured to cause the at least one processor to adjust the data throughput of the first application by using a CPU set control scheme of the slowdown schemes.

According to various embodiments, the instructions are configured to cause, when the CPU set control scheme is used, the at least one processor to change a core for processing the data of the first application from a first core to a second core having a slower processing speed than the first core.

Figure 4:
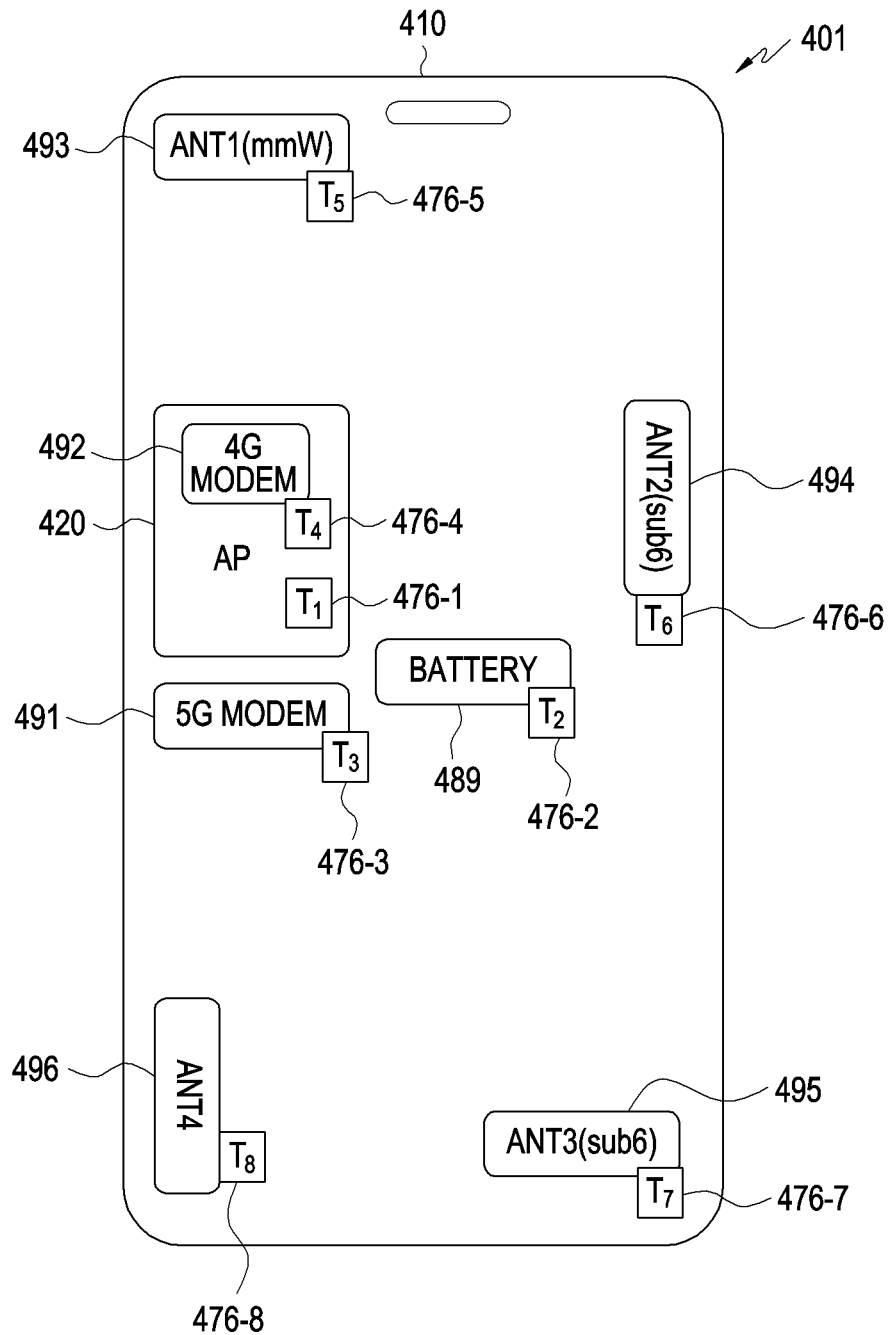
FIG. 4 illustrates temperature sensors and elements corresponding to heat-generating sources among elements of an electronic device according to an embodiment of the disclosure.

FIG. 4 illustrates temperature sensors and elements corresponding to heat-generating sources among elements of an electronic device according to an embodiment of the disclosure.

Referring to FIG. 4, the electronic device 401 may have various elements installed in a housing 410, and elements corresponding to heat-generating sources among the elements of the electronic device 401 may include a processor (AP) 420, a battery 489, a first communication circuit (5G modem) 491, a second communication circuit (4G or LTE modem) 492, a first antenna module (ANT1(mmWave)) 493, a second antenna module (ANT2(sub6)) 494, a third antenna module (ANT3(sub6)) 495, and a fourth antenna module (ANT4) 496. According to various embodiments, more elements, in addition to the elements described above, may be included in the housing 410 of the electronic device 401. The elements corresponding to the heat-generating sources may include some among the processor (AP) 420, the battery 489, the first communication circuit (5G modem) 491, the second communication circuit (4G or LTE modem) 492, the first antenna module (ANT1(mmWave)) 493, the second antenna module (ANT2(sub6)) 494, the third antenna module (ANT3(sub6)) 495, and the fourth antenna module (ANT4) 496, or may also further include an element corresponding to another heat-generating source.

According to various embodiments, the electronic device 401 may include temperature sensors 476-1 to 476-8 arranged in positions adjacent to elements 420, 489, 491, 492, 493, 494, 495, and 496 corresponding to heat-generating sources, respectively, so as to sense temperatures associated with the elements 420, 489, 491, 492, 493, 494, 495, and 496 corresponding to heat-generating sources, respectively.

According to various embodiments, in 5G communication, since a large amount of data must be processed by using a high-frequency band, the first communication circuit (5G modem) 491, the first antenna module (ANT1(mmWave)) 493, the second antenna module (ANT2(sub6)) 494, and the third antenna module (ANT3(sub6)) 495, which are elements associated with the 5G communication among the elements 420, 489, 491, 492, 493, 494, 495, and 496 corresponding to heat-generating sources, may consume a lot of power and generate a lot of heat. Therefore, the surface temperature due to heat generation of the electronic device 401 may become equal to or higher than a first threshold value due to heat generation of the elements associated with the 5G communication. According to one embodiment, in the state in which the surface temperature due to heat generation becomes equal to or higher than the first threshold value due to heat generation of elements corresponding to heat-generating sources which are not associated with the 5G communication, the surface temperature due to heat generation may be further raised by heat generation of the elements associated with the 5G communication. If an application, in which high data throughput associated with the 5G communication is required, is continuously executed in the electronic device 401, the electronic device 401 may be in an overheated state in which the surface temperature due to heat generation becomes equal to or higher than the first threshold value due to heat generation of the elements associated with the 5G communication. When the electronic device 401 is overheated, the surface of the electronic device 401 becomes hot, thus making a user using the electronic device 401 feel discomfort. Further, the overheating may damage internal components (e.g., a battery) and thus may have an effect on the overall performance of the electronic device 401.

According to various embodiments, when the electronic device 401 is overheated by heat generation of the elements associated with the 5G communication, the processor (AP) 420 may limit (reduce) data throughput (or rate) (e.g., data throughput (or rate) associated with the 5G communication for a predetermined time) of a first application, which is in a background state and in which data throughput associated with the 5G communication is equal to or more than a designated throughput, to reduce heat generation of the elements associated with the 5G communication, thereby preventing the performance of the electronic device 401 from becoming degraded by the heat generation.

Figure 5:
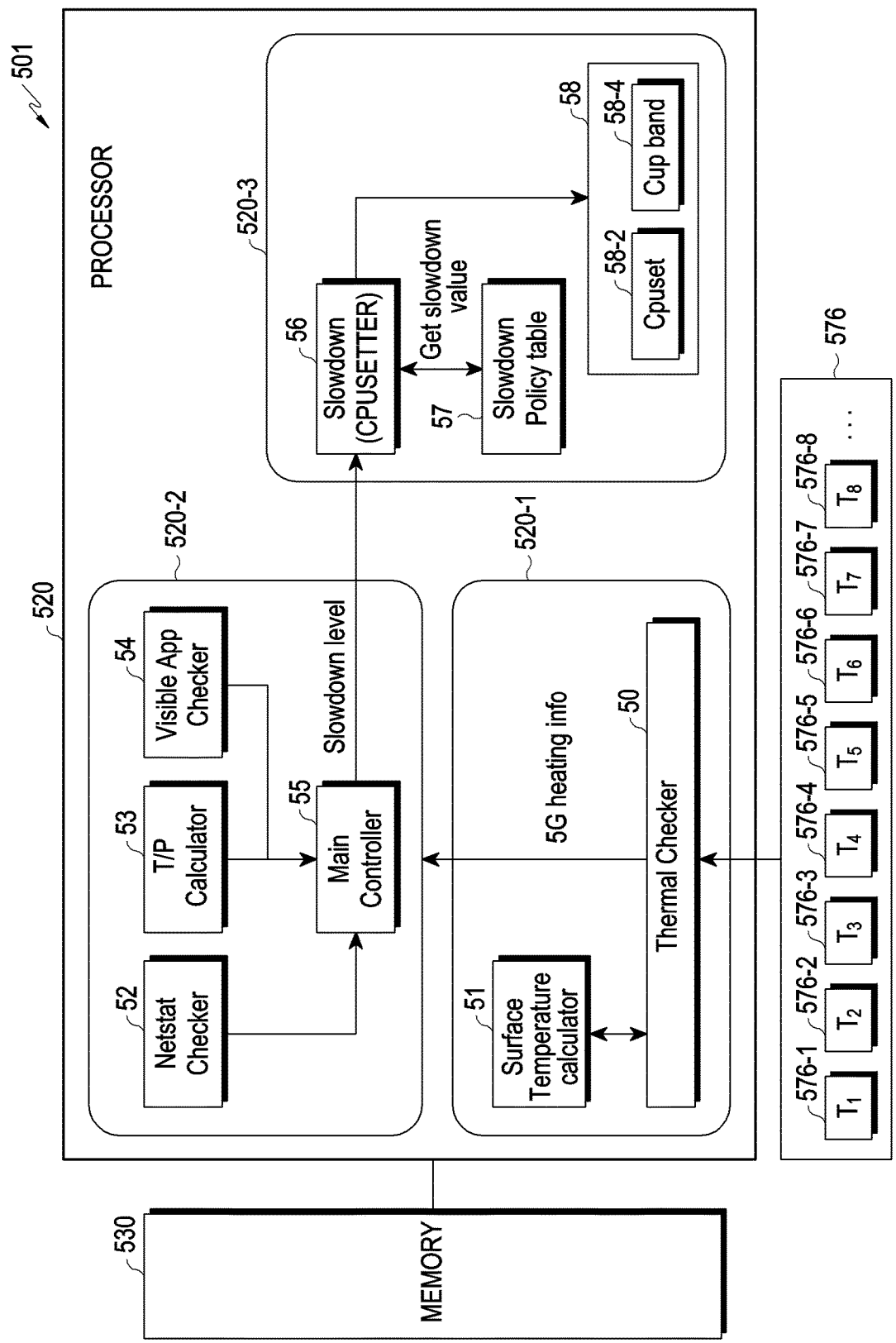
FIG. 5 is a view for describing the configuration of a processor in an electronic device according to an embodiment of the disclosure.

FIG. 5 is a view for describing the configuration of a processor in an electronic device according to an embodiment of the disclosure.

Referring to FIG. 5, the electronic device 501 may include a processor 520, a set of temperature sensors 576 including temperature sensors 576-1 to 576-8, and a memory 530. The temperature sensors 576-1 to 576-8 may include a first temperature sensor to an eighth temperature sensor. Further, the temperature sensors 576-1 to 576-8 may be arranged in positions adjacent to elements (e.g., an AP, a battery, a Wi-Fi module, a 4G PAM, a 5G modem, a 5G antenna module 1, a 5G antenna module 2, and/or a 5G antenna module 3) corresponding to heat-generating sources, respectively, so as to provide respective temperature values (internal temperatures) associated with the elements associated with the heat-generating sources.

According to various embodiments, the processor 520 may include a temperature checking module 520-1, a main module 520-2, and a control module 520-3.

According to various embodiments, the temperature checking module 520-1 may include a thermal checker 50 and a surface temperature calculator 51. The thermal checker 50 may obtain a temperature value (internal temperature) associated with the elements (e.g., the AP, the battery, the Wi-Fi module, the 4G PAM, the 5G modem, the 5G antenna module 1, the 5G antenna module 2, and/or the 5G antenna module 3) corresponding to the heat-generating sources from the temperature sensors 576-1 to 576-8. The surface temperature calculator 51 may check a first temperature (surface temperature due to heat generation) of the electronic device 501 on the basis of temperature values associated with the elements corresponding to the heat-generating sources, and may check whether the first temperature is equal to or higher than a first threshold value. When the first temperature (surface temperature due to heat generation) of the electronic device 501 is equal to or higher than the first threshold value, the thermal checker 50 may determine that the electronic device 501 is in an overheated state, and may determine whether the overheated state is an overheated due to 5G communication on the basis of temperature values of elements associated with the 5G communication (e.g., the 5G modem, the 5G antenna module 1, the 5G antenna module 2, and/or the 5G antenna module 3) among the elements corresponding to the heat-generating sources. When the overheated state is an overheated state due to the 5G communication, the thermal checker 50 may provide information (5G heating info) indicating the overheated state due to the 5G communication. According to various embodiments, the thermal checker 50 may determine whether or not the overheated state is an overheated state due to the 5G communication on the basis of at least one among: the temperature values associated with the elements associated with the 5G communication (e.g., the 5G modem, the 5G antenna module 1, the 5G antenna module 2, and/or the 5G antenna module 3); a 5G network connection state; a 5G electric field situation; or a 5G data usage amount.

According to various embodiments, the main module 520-2 may include a Netstat checker 52, a T/P calculator 53, a visible app checker 54, and a main controller 55. The Netstat checker 52 may check a Netstat information stored in the memory 530. The Netstat information may include network usage history information. According to one embodiment, the Netstat information may include information on a communication scheme-specific (network-specific) data usage amount of each application for each communication scheme. For example, the Netstat information may include information on a 4G communication-related data usage amount of each application and information on a 5G communication-related data usage amount of each application. The Netstat checker 52 may provide, based on the Netstat information stored in the memory 530, an ID (e.g., Uid) of at least one application having a data usage amount associated with the 5G communication.

The T/P calculator 53 (throughput calculator) may provide data throughput information (e.g., information on data throughput for a predetermined time) of at least one application being executed in the electronic device 501. For example, the T/P calculator 53 may provide data throughput information of at least one application which processes data associated with 5G communication among applications being executed in the electronic device 501.

The visible app checker 54 may provide information indicating whether an operation state of at least one application being executed in the electronic device 501 is in a background (invisible) state or a foreground (visible) state.

The main controller 55 may monitor, using the Netstat checker 52, an ID of at least one having a data usage amount associated with the 5G communication, may monitor, using the T/P calculator 53, the data throughput of at least one application which processes data associated with the 5G communication among applications being executed in the electronic device 501, and may monitor, using the visible app checker 54, whether the operation state of at least one application being executed in the electronic device 501 is a background (invisible) state or a foreground (visible) state. The main controller 55 may provide, to the control module 520-3, an ID of at least one having a data usage amount associated with the 5G communication, data throughput of the at least one application, and/or a list of applications, the data throughput of which is to be controlled based on an operation state of the at least one application in the electronic device 501, and a control level (e.g., a slowdown level).

According to various embodiments, the control module 520-3 may include a slowdown (CPUsetter) 56, a slowdown policy table 57, and a kernel interface 58. According to one embodiment, the slowdown (CPUsetter) 56 may receive the application list and the control level (e.g., the slowdown level) for controlling the data throughput from the main controller 55, and may obtain a slowdown value from the slowdown policy table 57 and perform slowdown control. According to one embodiment, the slowdown control scheme may include at least one of a CPU control scheme or a CPU set control scheme among CPU running time control schemes. For example, the CPU set control scheme may be a scheme in which application tasks being processed in a first core (e.g., a Big core) among multiple cores different in processing performance in a CPU from each other are moved so as to be processed in a second core (e.g., a Little core). The first core, which has large data throughput, may be a core capable of increasing the heat generation amount. The second core, which has smaller data throughput than the first core, may be a core capable of further reducing the heat generation amount than when using the first core. For example, the CPU running time control scheme may be a scheme of adjusting a CPU usage amount by operating an application in a CPU only for a particular time (quota) during a particular period. The particular period and the particular time (quota) value may be calculated and used according to data throughput of an application for processing 5G data in the main module 520-2 and the overheated level of the electronic device 501. For example, when a task in a particular process of an application is performed in a first core to an eighth core (cores 0 to 7) of the CPU and is executed for a running time of five to six seconds during one period (e.g., 10 seconds) in each core, if the quota value is changed to three seconds by applying the slowdown, the particular process may not be performed for more than three seconds in each core. According to one embodiment, the slowdown (CPUsetter) 56 may control a CPU set 58-2 or a CPU running time 58-4 via the kernel interface 58 by using slowdown control information (limit policy for UID) for an application having data throughput to be controlled.

According to various embodiments, a method for controlling data throughput based on heat generation in an electronic device (e.g., the electronic device 101 in FIGS. 1 and 2, the electronic device 301 in FIG. 3, the electronic device 401 in FIG. 4, or the electronic device 501 in FIG. 5) may include: obtaining a first temperature associated with the electronic device via a plurality of temperature sensors (e.g., the sensor module 176 in FIG. 1, the temperature sensors 376 in FIG. 3, or the temperature sensors 476-1 to 476-8); identifying(or checking) a second temperature associated with a first communication when the first temperature is equal to or higher than a first threshold value; identifying(or checking), based on the second temperature, an operation state of at least one application in which data throughput associated with the first communication is equal to or more than designated throughput; and adjusting first data throughput of a first application, which is operating in a background state, among the at least one application.

According to various embodiments, the first temperature is a temperature on a surface of a housing based on heat generation in the electronic device.

According to various embodiments, second data throughput of a second application, which is operating in a foreground state, among the at least one application is not adjusted.

According to various embodiments, the background state comprises a state in which the electronic device displays a screen on a display of the electronic device, and the foreground state comprises a state in which the electronic device does not display a screen on the display of the electronic device.

According to various embodiments, the first data throughput of the first application is adjusted by using a CPU running time control scheme among slowdown schemes.

According to various embodiments, when the CPU running time control scheme is used, the method may change the time for processing data of the first application in a CPU bandwidth from a first time interval to a second time interval smaller than the first time interval.

According to various embodiments, the method may change a quota value in a bandwidth for processing data of the first application from a first time value to a second time value smaller than the first time value.

According to various embodiments, the method may adjust the first data throughput of the first application by using a CPU set control scheme among the slowdown schemes.

According to various embodiments, when the CPU set control scheme is used, the method may change a core for processing data of the first application from a first core to a second core which has a slower processing speed than the first core.

Figure 6:
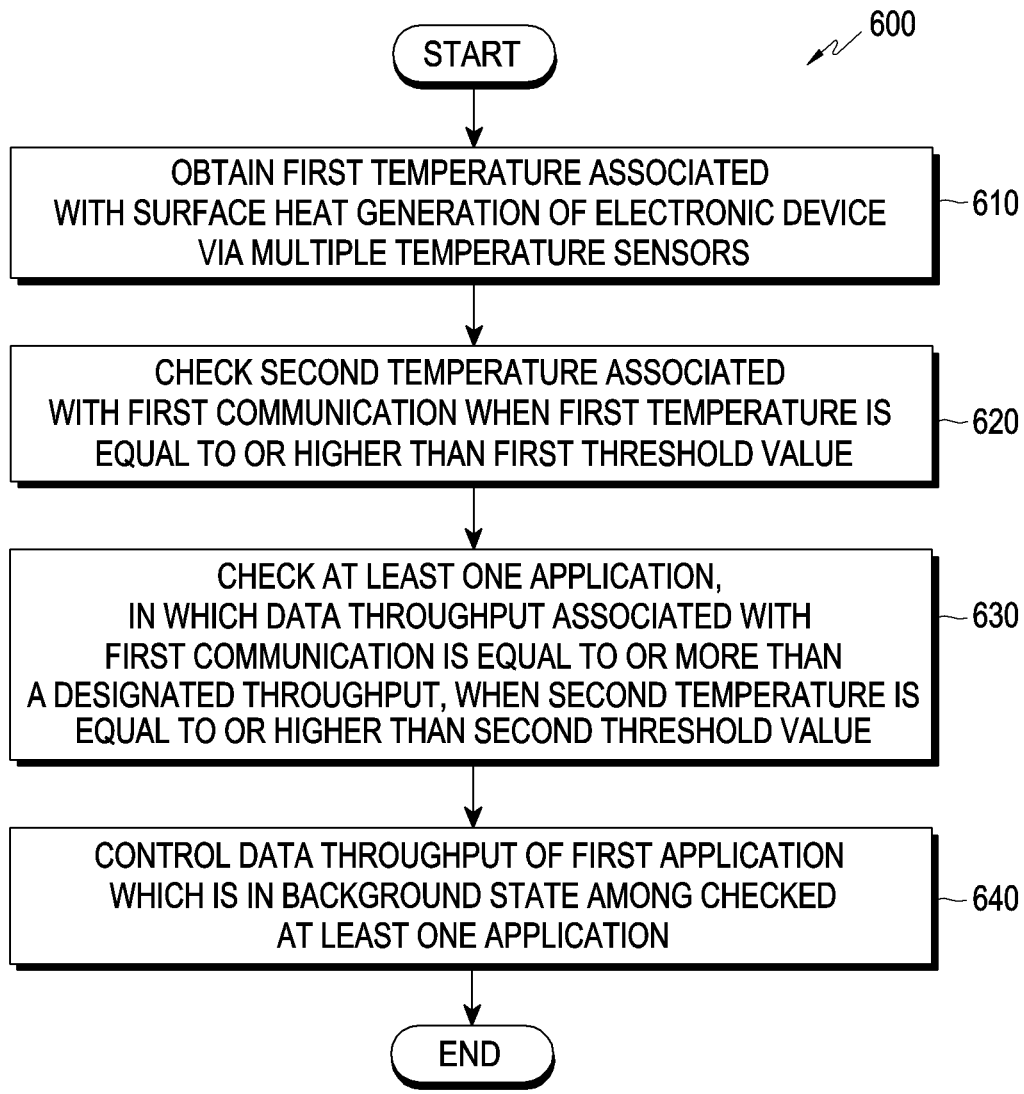
FIG. 6 is a flowchart of operations for data throughput control based on heat generation in an electronic device according to an embodiment of the disclosure.

FIG. 6 is an operation flowchart 600 for data throughput control based on heat generation in an electronic device according to an embodiment of the disclosure.

Referring to FIG. 6, an operation method may include operations 610 to 640. Each operation (or each step) of the operation method may be performed by at least one of one or more processors (e.g., the processor 120 in FIGS. 1 and 2, the processor 320 in FIG. 3, the processor 420 in FIG. 4, or the processor 520 in FIG. 5) of an electronic device (e.g., the electronic device 101 in FIGS. 1 and 2, the electronic device 301 in FIG. 3, the electronic device 401 in FIG. 4, or the electronic device 501 in FIG. 5). According to one embodiment, at least one of operations 610 to 640 may be omitted, the order of some operations may be changed, and another operation may be added.

In operation 610, the electronic device 501 may obtain a first temperature (e.g., surface temperature due to heat generation) associated with surface heat generation of the electronic device 501 by using temperature sensors (e.g., the temperature sensors 376 in FIG. 3, the temperature sensors (e.g., temperature sensors 476 in FIG. 4, or the temperature sensors 576-1 to 576-8 in FIG. 5) arranged in positions corresponding to heat-generating sources (elements designated as heat-generating sources) (or at least one of temperature sensors respectively arranged in positions corresponding to the heat-generating sources (elements designated as heat-generating sources)) among the elements included in the electronic device 301. For example, the processor 520 may obtain a first temperature of the electronic device 501 by periodically checking temperature values (or a temperature value) measured by temperature sensors (or at least one temperature sensor) associated with surface heat generation among the temperature sensors 576-1 to 576-8 according to a designated period. Alternatively, the processor 520 may obtain the first temperature by using temperature values (or a temperature value) measured by the temperature sensors (or at least one temperature sensor) associated with surface heat generation and an algorithm (e.g., linear regression analysis algorithm) stored to predict a surface temperature due to heat generation. For example, the processor 520 may obtain the first temperature by using temperature values (or a temperature value) from temperature sensors (at least one of the temperature sensors) arranged adjacent to the surface of the electronic device 501, or may obtain the first temperature predicted through learning which gives consideration to temperature values (a temperature value) from the temperature sensors (at least one of temperature sensors) and the operation type of the electronic device 501.

In operation 620, the processor 520 may check a second temperature associated with a first communication (e.g., a 5G communication) when the first temperature is equal to or higher than a designated temperature (e.g., a first threshold value or a first threshold temperature value). According to various embodiments, the designated temperature is a surface temperature due to heat generation, at which the electronic device 501 (or at least one element of the electronic device 501) may malfunction or a user may feel discomfort due to heat generation during the use of the electronic device 501. The designated temperature may be a first threshold value or a first threshold temperature value, and may be stored in the electronic device 501. For example, the first threshold value or the first threshold temperature value may be 38° C. In addition, the first threshold value or the first threshold temperature value may be configured as another value according to the performance of the electronic device 501 and the external environment. When the first temperature is equal to or higher than the designated temperature, the processor 520 may determine the state of the electronic device 501 to be an overheated state. According to various embodiments, the second temperature associated with the first communication may be a temperature due to heat generation of at least one of first-communication-related elements (e.g., a 5G modem, a 5G PAM, a 5G antenna) among the elements included in the electronic device 501. According to one embodiment, the processor 520 may check the second temperature on the basis of a temperature value obtained by at least one of the temperature sensors 576-1 to 576-8, which is adjacent to elements operating while the first communication is performed.

In operation 630, the processor 520 may check, based on the second temperature, the operation state of at least one application in which data throughput (e.g., the data usage amount) associated with the first communication is equal to or more than designated throughput (e.g., the designated usage amount). According to one embodiment, when the second temperature is equal to or higher than a second threshold value, the processor 520 may determine that the electronic device 501 is in an overheated state due to the first communication. According to one embodiment, the second threshold value may be equal to or greater than the first threshold value. According to one embodiment, in the state in which the first temperature is equal to or higher than the first threshold value, when the second temperature is higher than temperatures generated by other elements included in the electronic device 501, the processor 520 may determine that the electronic device 501 is in an overheated state due to the first communication. According to one embodiment, in the state in which the first temperature is equal to or higher than the first threshold value, when the second temperature is higher than temperatures generated by other elements included in the electronic device 501 and is higher than the first temperature by a designated temperature (10° C.) or more, the processor 520 may determine that the electronic device 501 is in an overheated state due to the first communication. According to one embodiment, in the state in which the first temperature is equal to or higher than the first threshold value, when the temperature sensor, the temperature of which is highest among the temperatures of the temperature sensors 576-1 to 576-8, is a temperature sensor associated with a first-communication-related element, the processor 520 may determine that the electronic device 501 is in an overheated state due to the first communication. According to various embodiments, when the electronic device is determined to be in an overheated state due to the first communication, the processor 520 may check the operation state of at least one application in which data throughput associated with the first communication is equal to or more than designated throughput. According to one embodiment, when the electronic device is determined to be in an overheated state due to the first communication, the processor 520 may identify, using network usage history information (Netstat information), at least one application in which a 5G data usage amount is equal to or more than a designated usage amount. For example, when the electronic device is determined to be in an overheated state due to the first communication, the processor 520 may identify at least one application in which data throughput (e.g., data throughput for a predetermined time) associated with the first communication is equal to or more than designated data throughput (e.g., 50 Mpbs).

In operation 640, the processor 520 may adjust data throughput of a first application which is in a background state among the identified at least one application. According to various embodiments, the processor 520 may identify whether the operation state of the identified at least one application is a background operation state or a foreground operation state. For example, the background operation state may be an invisible state in which a display function of an application is not performed, and the foreground operation state may be a visible state in which the display function of the application is performed. For example, the processor 520 may identify, using a call stack of a window manager, whether the operation state of at least one application is an invisible state or a visible state. According to various embodiments, when the electronic device 501 is in an overheated state due to the first communication, the processor 520 may control data throughput (or rate) of a first application which is in a background state and in which data throughput associated with the first communication is equal to or more than designated throughput. According to one embodiment, when the electronic device 501 is in an overheated state due to the first communication, the processor 520 may reduce the data throughput (or rate) of the first application which is operating in a background state and in which data throughput (e.g., data throughput for a predetermined time) associated with the first communication is equal to or more than designated data throughput (e.g., 50 Mpbs), but may not reduce or may increase the data throughput (or rate) of a second application which is operating in a foreground state and in which the data throughput associated with the first communication is equal to or more than the designated data throughput (e.g., 50 Mpbs). According to various embodiments, the processor 520 may apply a preconfigured control policy (or control scheme) (e.g., a slowdown scheme) to controlling the data throughput (or rate) of the first application. According to various embodiments, the slowdown scheme may include at least one of a CPU set control scheme or a CPU running time control scheme. According to one embodiment, when the CPU set control scheme is used, the processor 520 may reduce the data throughput (or rate) of the first application by causing a core having low data throughput (or data usage amount) (e.g., a core having data throughput equal to or less than a threshold value) among multiple cores different in CPU processing performance to process data of the first application.

According to various embodiments, the processor 520 may select a CPU running time control level or a CPU set control level depending on the level of heat generated due to the first communication and on the size (or amount) of data throughput of the first application. According to various embodiments, the processor 520 may provide a CPU running time control value according to the selected CPU running time control level, or may provide a CPU set control value according to the selected CPU set control level. For example, the processor 520 may be configured such that a reduction value of data throughput increases as a temperature due to heat generation by the first communication rises, and the reduction value of data throughput increases as the size of data throughput of the first application increases. For example, the processor 520 may configure a reduction value of data throughput in consideration of both the temperature due to heat generation by the first communication and the size of data throughput of the first application.

According to various embodiments, when the CPU running time control scheme is used, the processor 520 may reduce of the data throughput (or rate) of the first application by reducing a running time related to processing data of the first application in a bandwidth of a CPU for processing the data of the first application. For example, as the data throughput (or rate) of the first application is reduced, data throughput associated with the first communication is reduced and thus a load applied to elements associated with the first communication is reduced. Therefore, the heat generation amount of each of the elements associated with the first communication may be reduced. The surface temperature due to heat generation of the electronic device 501 may also be decreased by the reduction of the heat generation amount of each of the elements associated with the first communication, and thus the heat generation state of the electronic device 501 may return from an overheated state to a normal state. In other words, when the first temperature of the electronic device 501 is lower than the first threshold value or the second temperature is lower than the second threshold value, the electronic device 501 may return from an overheated state to a normal state. According to various embodiments, when the heat generation state of the electronic device 501 returns from an overheated state to a normal state, the processor 520 may stop controlling the data throughput of the first application and may process data based on data throughput in a default state.

Figure 7:
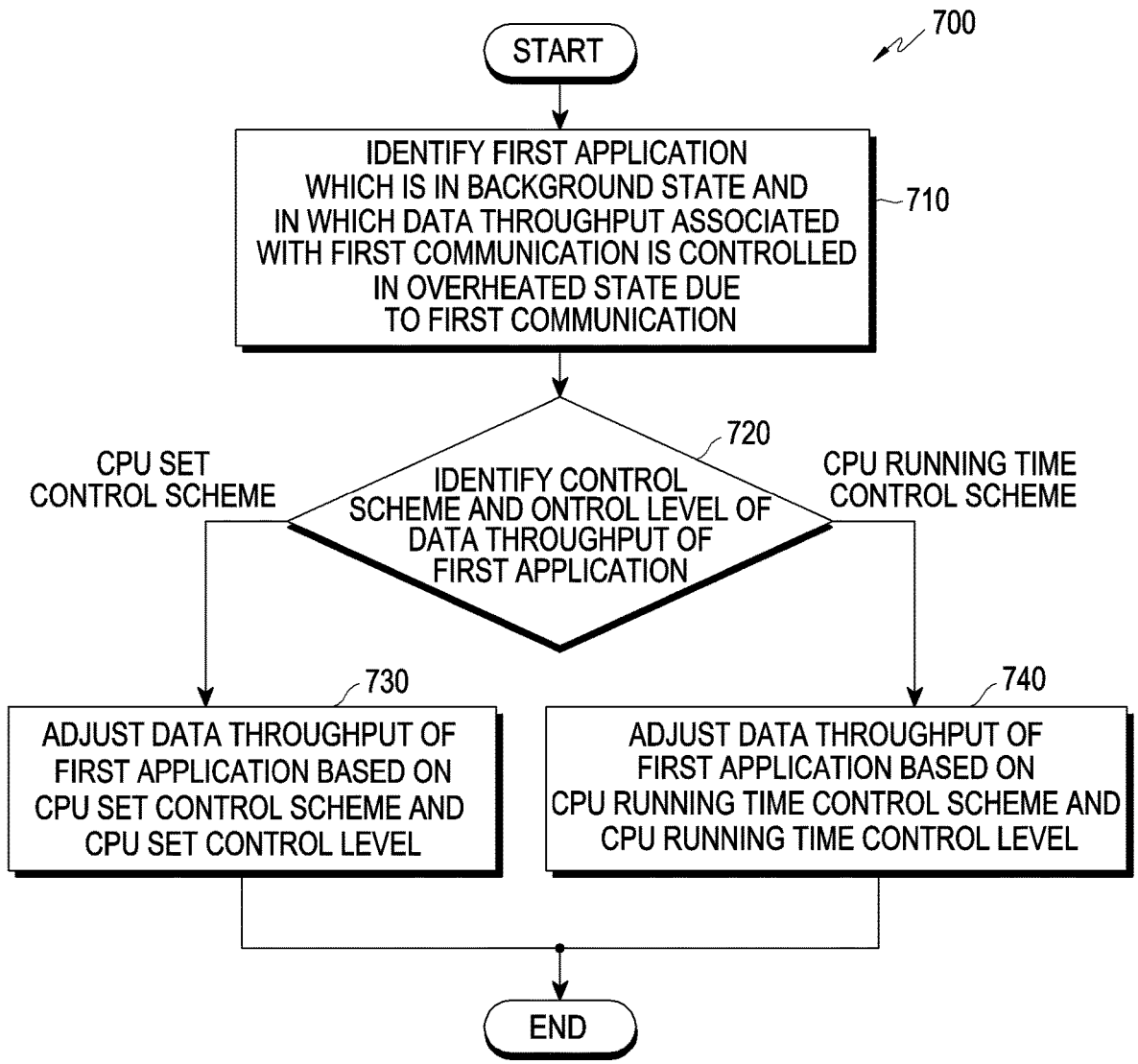
FIG. 7 is a flowchart illustrating application data processing operations in an electronic device according to an embodiment of the disclosure.

FIG. 7 is a flowchart 700 illustrating application data processing operations in an electronic device according to an embodiment of the disclosure.

Referring to FIG. 7, an operation method may include operations 710 to 740. Each operation (or each step) of the operation method may be performed by at least one of one or more processors (e.g., the processor 120 in FIGS. 1 and 2, the processor 320 in FIG. 3, the processor 420 in FIG. 4, or the processor 520 in FIG. 5) of an electronic device (e.g., the electronic device 101 in FIGS. 1 and 2, the electronic device 301 in FIG. 3, the electronic device 401 in FIG. 4, or the electronic device 501 in FIG. 5). According to one embodiment, at least one of operations 710 to 740 may be omitted, the order of some operations may be changed, and another operation may be added.

In operation 710, the processor 520 may identify an application in which data throughput associated with first communication is controlled based on an overheated state due to the first communication. According to one embodiment, the processor 520 may obtain an ID of at least one application having data throughput (or data usage amount) associated with 5G communication, data throughput of the at least one application, and/or a list of applications, the data throughput of which is to be controlled based on an operation state of the at least one application in the electronic device 501.

In operation 720, the processor 520 may identify a control scheme and a control level of application data throughput. According to various embodiments, the processor 520 may identify whether the control scheme is a CPU set control scheme or a CPU running time control scheme among slowdown schemes. When the control scheme is the CPU set control scheme, the processor 520 may identify a CPU set control level. When the control scheme is the CPU running time control scheme, the processor 520 may identify a CPU running time control level. For example, the CPU set control level may indicate which of multiple cores of a CPU is to be used and the usage level of the core. The CPU running time control level may be a level indicating how long the running time of a CPU bandwidth is adjusted.

In operation 730, on the basis of the CPU set control scheme and the CPU set control level, the processor 520 may move tasks of the application being processed in a first core (e.g., a Big core) among multiple cores in a CPU, which are different in processing performance from each other, so that the tasks are processed in a second core (e.g., a Little core). For example, when the tasks of the application are moved to a Little core having small data throughput and processed, the data throughput of the application may be reduced.

In operation 740, on the basis of the CPU running time control scheme and the CPU running time control level, the processor 520 may change a quota value such that a CPU bandwidth allocated to the application is reduced from a first bandwidth (e.g., five to six seconds) to a second bandwidth (e.g., three seconds). For example, when the quota value is changed to three seconds, a process associated with the application cannot be executed for more than three seconds per bandwidth in a CPU (or each core of the CPU), and thus the data throughput of the application may be reduced.

Figure 8A:
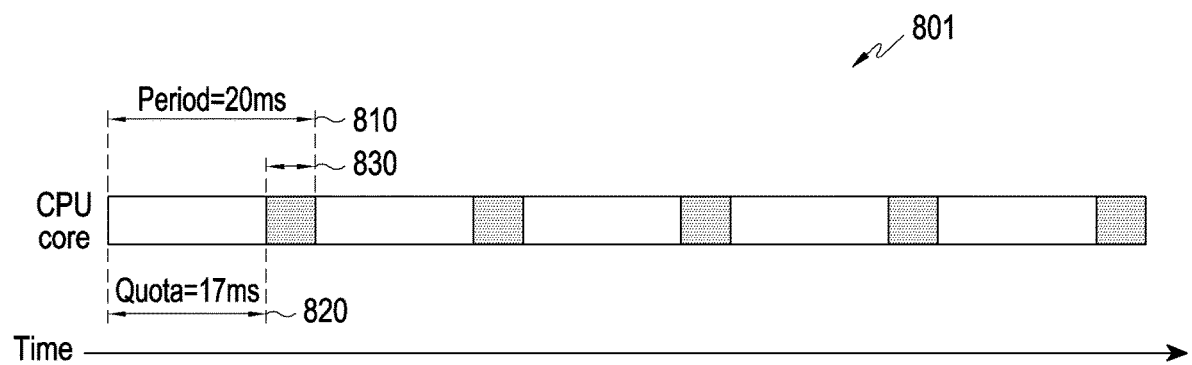
FIG. 8A is a view for describing a central processing unit (CPU) running time according to an embodiment of the disclosure.
Figure 8B:
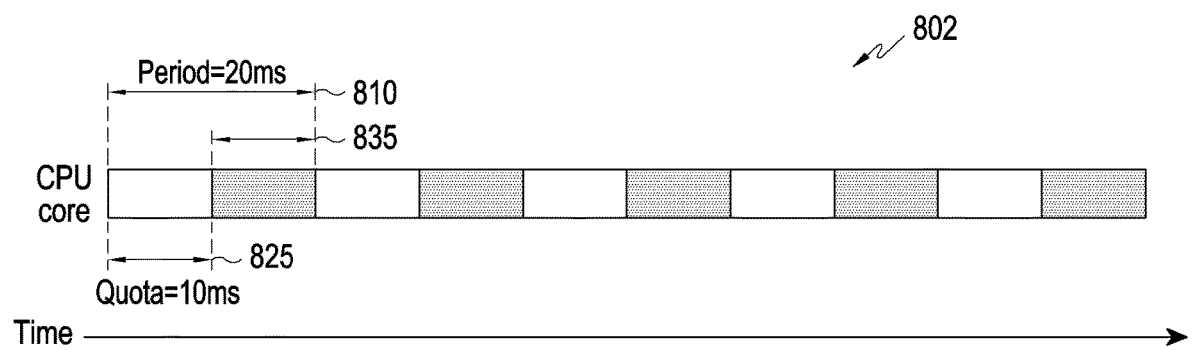
FIG. 8B is a view for describing the state in which CPU running time is controlled according to an embodiment of the disclosure.

FIG. 8A is a view 801 for describing CPU running time according to various embodiments, and FIG. 8B is a view 802 for describing the state in which CPU running time is controlled according to an embodiment of the disclosure.

Referring to FIGS. 8A and 8B, at least one processor (the processor 120 in FIGS. 1 and 2, the processor 320 in FIG. 3, the processor 420 in FIG. 4, or the processor 520 in FIG.

5) of an electronic device (e.g., the electronic device 101 in FIGS.-s. 1 and 2, the electronic device 301 in FIG. 3, the electronic device 401 in FIG. 4, or the electronic device 501 in FIG. 5) may include a CPU (or AP), and the CPU may include at least one core.

Referring to FIG. 8A, a CPU core according to various embodiments may operate using a designated time period 810 (e.g., period=20 ms), and may be configured: to process data (e.g., tasks) of a first application for a designated (or default) bandwidth (hereinafter, referred to as "first bandwidth") period 820 (e.g., quota=17 ms) for each period in a default state, and not to process the data of the first application for a period 830 (e.g., 3 ms) other than the first bandwidth period 820.

Referring to FIG. 8B, when the first application, in which data throughput associated with first communication is controlled based on an overheated state due to the first communication, and a CPU running time control level of the first application are identified, the processor 520 according to various embodiments may reduce the first bandwidth period 820 associated with the first application. For example, when a quota value corresponding to the CPU running time control level of the first application is adjusted (limited) to 10 ms, the processor 520 may process of data (tasks) of the first application for a second bandwidth period 825 (e.g., quota=10 ms) for each period, and may not process the data of the first application for a period 835 (e.g., 10 ms) other than the second bandwidth period 825. According to one embodiment, the processor 520 may be configured such that, for the period 835 (e.g., 10 ms) other than the second bandwidth period 825, the processor 520 does not process the data of first application but processes a second application or another process. According to various embodiments, when the quota value is changed from 17 ms to 10 ms, a process associated with the first application may not be executed for more than 10 ms per period in a core of a CPU and thus data throughput of the first application may be reduced. Further, when the data throughput of the first application is reduced, heat generation associated with the first communication may be reduced and thus the performance of the electronic device 501 may be prevented from becoming degraded due to heat generation.

Figure 9A:
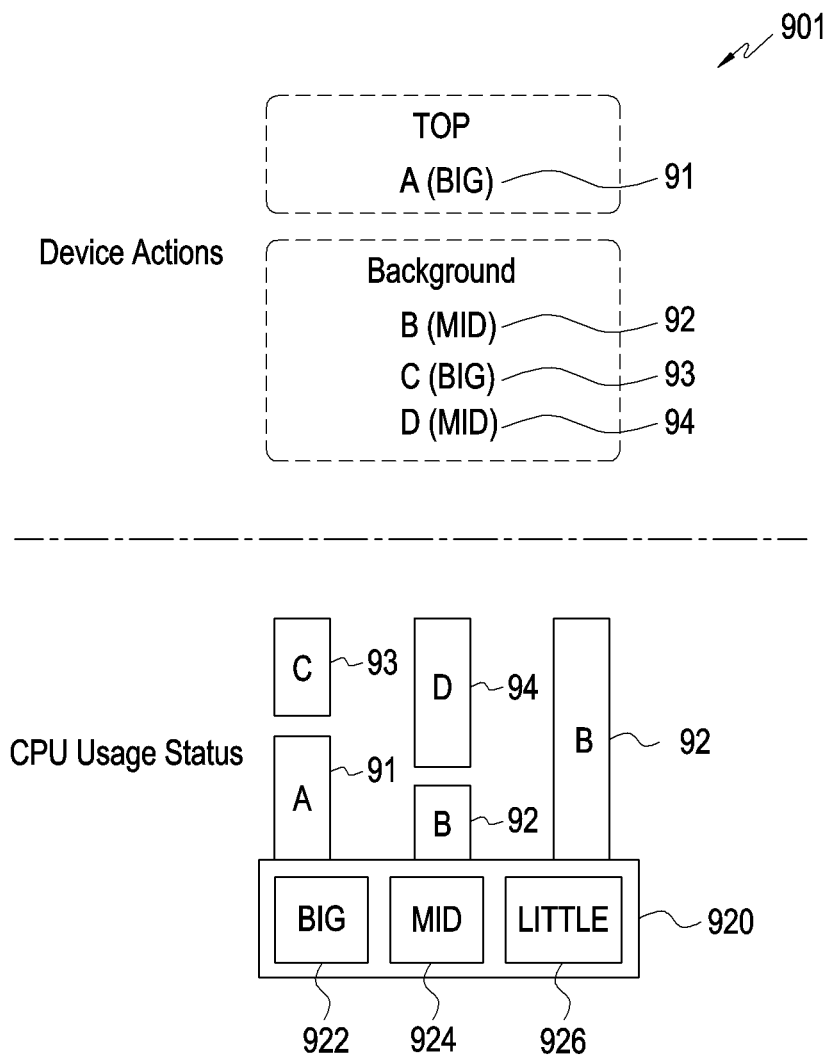
FIG. 9A is a view for describing a CPU set according to an embodiment of the disclosure.
Figure 9B:
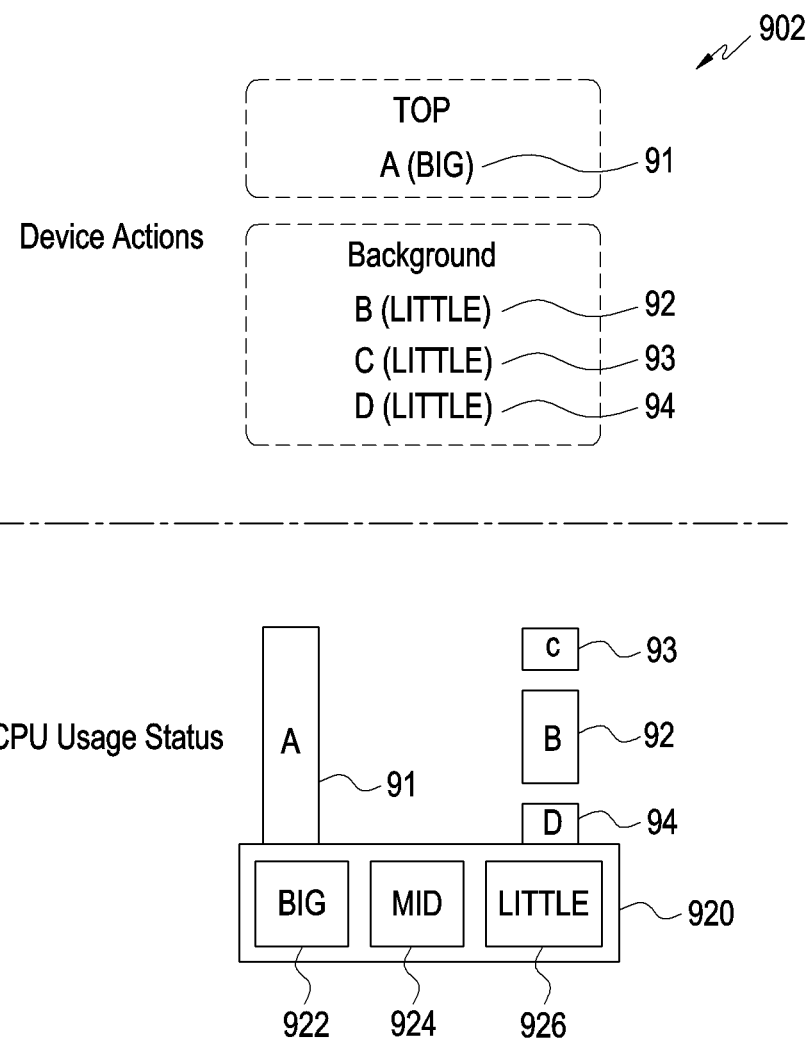
FIG. 9B is a view for describing the state in which a CPU set is controlled according to an embodiment of the disclosure.

FIG. 9A is a view 901 for describing CPU set according to various embodiments, and FIG. 9B is a view 902 for describing the state in which CPU set is controlled according to various embodiments of the disclosure.

Referring to FIGS. 9A and 9B, at least one processor (the processor 120 in FIGS. 1 and 2, the processor 320 in FIG. 3, the processor 420 in FIG. 4, or the processor 520 in FIG. 5) of an electronic device (e.g., the electronic device 101 in FIGS. 1 and 2, the electronic device 301 in FIG. 3, the electronic device 401 in FIG. 4, or the electronic device 501 in FIG. 5) may include a CPU (or AP) 920, and the CPU 920 may include multiple cores. According to one embodiment, the multiple cores may include a first core 922, a second core 924, and a third core 926. In addition, the multiple cores may further include another core. For example, the first core 922 may be a BIG core, the second core 924 may be a MID core, and the third core 926 may be LITTLE core. The BIG core may be a core cable of processing data at a first speed (Hz), the MID core may be a core capable of processing data at a second speed slower than the first speed, and the LITTLE core may be a core capable of processing data at a third speed slower than the second speed.

Referring to FIG. 9A, the CPU 920 according to various embodiments may process tasks (or data) of applications, such as A 91 (e.g., a game application), B 92 (e.g., a photo application), C 93 (e.g., a video application), and D 94 (e.g., a web browser application). According to one embodiment, in a default state (which is not an overheated state), according to a designated data distribution processing method, the CPU 920 may distribute applications A 91, B 92, C 93, and D 94 to at least one of multiple cores and process the same. For example, the CPU 920 may process data of applications A 91 and C 93 by using the BIG core 922 among the multiple cores, may process data of applications B 92 and D 94 by using the MID core 924, and may process data of application B 92 by using the LITTLE core 926.

Referring to FIG. 9B, when the electronic device is overheated by first communication, if application C 93, in which data throughput associated with the first communication is high and which is in a background state, and the CPU set control level of the application C 93 are identified, the CPU 920 according to various embodiments may move data (e.g., tasks) of application C 93 being processed in the BIG core 922 so as to be processed in the LITTLE core 926.

According to various embodiments, when application C 93 is processed in the LITTLE core 926, the processing speed of application C 93 is slow and the throughput thereof is reduced, and thus heat generation associated with the first communication is reduced. Therefore, the performance of the electronic device 501 may be prevented from becoming degraded due to heat generation thereof. For example, when application C 93 is processed in the LITTLE core 926, the performance of A 91 (e.g., a game application) being executed in a foreground (e.g., Top) may be prevented from becoming degraded.

FIG. 10 illustrates an example of a table showing the result of performance and heat generation improvement before and after application data throughput control according to an embodiment of the disclosure.

Referring to FIG. 10, when at least one processor (the processor 120 in FIGS. 1 and 2, the processor 320 in FIG. 3, the processor 420 in FIG. 4, or the processor 520 in FIG. 5) of an electronic device (e.g., the electronic device 101 in FIGS. 1 and 2, the electronic device 301 in FIG. 3, the electronic device 401 in FIG. 4, or the electronic device 501 in FIG. 5) has controlled data throughput of a first application, which is in a background state and in which data throughput associated with first communication is equal to or more than a threshold value, on the basis of an overheated state due to the first communication in the course of processing tasks (or data) of the first application and a second application in a default state, the at least one processor may show the result of performance and heat generation improvement before and after controlling the data throughput of the first application.

For example, it may be identified that, when the processor 520 has controlled the data throughput of the first application, the CPU occupancy rate (%) and the data throughput (Mbps) after data throughput control may be lower than those before data throughput control, and therefore, since the frame per second (FPS) and stability of the second application are relatively improved and the surface temperature due to heat generation decreases, the heat generation of the electronic device 501 is improved.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, in a non-transitory computer-readable storage medium storing instructions, the instructions are configured to cause at least one processor to perform at least one operation when the instructions are executed by the at least one processor. The at least one operation may include: obtaining a first temperature associated with an electronic device via temperature sensors; identifying(or checking) a second temperature associated with the first communication when the first temperature is equal to or higher than a first threshold value; identifying(or checking) an operation state of at least one application, in which data throughput associated with the first communication is equal to or more than designated throughput, when the second temperature is equal to or higher than a second threshold value; and adjusting first data throughput of a first application, which is operating in a background state, among the at least one application.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
at least one antenna module;
first communication circuitry configured to provide first communication via the at least one antenna module;
a plurality of temperature sensors;
at least one processor operationally connected to the first communication circuitry and the plurality of temperature sensors; and
memory,
for storing instructions that, when executed by the at least one processor, cause the electronic device to:
obtain a first temperature associated with the electronic device via the plurality of temperature sensors,
based on the first temperature being equal to or higher than a first threshold value, obtain a second temperature associated with the first communication via the plurality of temperature sensors,
identify an operation state of at least one application, in which data throughput associated with the first communication is equal to or more than designated throughput, based on the second temperature being equal to or higher than a second threshold value, and adjust first data throughput of a first application, which is operating in a background state, among the at least one application.

2. The electronic device of claim 1, further comprising: a housing,
wherein the first temperature comprises a temperature on a surface of the housing based on heat generation in the electronic device.

3. The electronic device of claim 1, wherein the instructions, when executed by the at least one processor, cause the electronic device not to adjust second data throughput of a second application, which is operating in a foreground state, among the at least one application.

4. The electronic device of claim 3, further comprising: a display,
wherein the background state comprises a state in which the electronic device displays a screen on the display of the electronic device, and
wherein the foreground state comprises a state in which the electronic device does not display a screen on the display of the electronic device.

5. The electronic device of claim 1, wherein the instructions, when executed by the at least one processor, cause the electronic device to adjust the first data throughput of the first application by using a plurality of slowdown schemes.

6. The electronic device of claim 5, wherein the instructions, when executed by the at least one processor, cause the electronic device to adjust the first data throughput of the first application by using a central processing unit (CPU) running time control scheme among a plurality of slowdown schemes.

7. The electronic device of claim 6, wherein the instructions, when executed by the at least one processor, cause, based on the CPU running time control scheme being used, the electronic device to change a time for processing data of the first application within a CPU bandwidth from a first time interval to a second time interval which is smaller than the first time interval.

8. The electronic device of claim 7, wherein the instructions, when executed by the at least one processor, cause, based on the CPU running time control scheme being used, the electronic device to change a quota value within a bandwidth for processing the data of the first application from a first time value to a second time value smaller than the first time value.

9. The electronic device of claim 1, wherein the instructions, when executed by the at least one processor, cause the electronic device to adjust the data throughput of the first application by using a CPU set control scheme among a plurality of slowdown schemes.

10. The electronic device of claim 9,
wherein the at least one processor comprises a first core and a second core, and
wherein the instructions, when executed by the at least one processor, cause, based on the CPU set control scheme being used, the electronic device to change a core for processing the data of the first application from the first core to the second core having a slower processing speed than the first core.

11. The electronic device of claim 1, further comprising:
second communication circuitry configured to provide second communication via the at least one antenna module,
wherein the first communication circuitry and the second communication circuitry operate in different networks.

12. The electronic device of claim 11,
wherein the first communication circuitry comprises a 5th Generation (5G) modem, and
wherein the second communication circuitry comprises a 4th Generation (4G) or long-term evolution (LTE) modem.

13. A method for controlling data throughput based on heat generation in an electronic device, the method comprising:
obtaining a first temperature associated with the electronic device via plurality of temperature sensors;
based on the first temperature being equal to or higher than a first threshold value, obtaining a second temperature associated with a first communication via the plurality of temperature sensors;
identifying an operation state of at least one application, in which data throughput associated with the first communication is equal to or more than designated throughput, based on the second temperature being equal to or higher than a second threshold value; and
adjusting first data throughput of a first application, which is operating in a background state, among the at least one application.

14. The method of claim 13, wherein the first temperature comprises a temperature on a surface of a housing of the electronic device based on heat generation in the electronic device.

15. The method of claim 13, wherein second data throughput of a second application, which is operating in a foreground state, among the at least one application is not adjusted.

16. The method of claim 15,
wherein the background state comprises a state in which the electronic device displays a screen on a display of the electronic device, and
wherein the foreground state comprises a state in which the electronic device does not display a screen on the display of the electronic device.

17. The method of claim 13, wherein the first data throughput of the first application is adjusted by using a CPU running time control scheme among slowdown schemes.

18. The method of claim 17,
wherein, based on the CPU running time control scheme being used, a time for processing data of the first application within a CPU bandwidth is changed from a first time interval to a second time interval smaller than the first time interval, and
wherein a quota value within a bandwidth for processing the data of the first application is changed from a first time value to a second time value smaller than the first time value.

19. The method of claim 13,
wherein the first data throughput of the first application is adjusted by using a CPU set control scheme among a plurality of slowdown schemes, and
wherein, based on the CPU set control scheme being used, a core for processing the data of the first application is changed from a first core to a second core having a slower processing speed than the first core.

20. A non-transitory computer-readable recording medium having recorded thereon at least one program comprising commands, which when executed by a computer, performs a method, the method comprising:
obtaining a first temperature associated with an electronic device via plurality of temperature sensors;
based on the first temperature being equal to or higher than a first threshold value, obtaining a second temperature associated with a first communication via the plurality of temperature sensors;

identifying an operation state of at least one application, in which data throughput associated with the first communication is equal to or more than designated throughput, based on the second temperature being equal to or higher than a second threshold value; and adjusting first data throughput of a first application, which is operating in a background state, among the at least one application.

21. The electronic device of claim 1, wherein first threshold value is a different value than the second threshold value.

* * * * *